United States Patent [19]

DeBoynton

[11] 4,203,328
[45] May 20, 1980

[54] ROTARY-TO-LINEAR-MOTION CONVERTER

[75] Inventor: William L. DeBoynton, South Pasadena, Calif.

[73] Assignee: The Perkin-Elmer Corporation, Norwalk, Conn.

[21] Appl. No.: 942,570

[22] Filed: Sep. 15, 1978

[51] Int. Cl.² ............................................. F16H 21/16
[52] U.S. Cl. ...................... 74/25; 74/198; 74/89
[58] Field of Search .................. 74/198, 99 R, 89 R, 74/25

[56] References Cited

U.S. PATENT DOCUMENTS

| 2,940,322 | 6/1960 | Uhing | 74/22 |
| 3,046,801 | 7/1962 | Pravel | 74/25 |
| 3,081,639 | 3/1963 | Hauptman | 74/25 |
| 3,272,021 | 9/1966 | Weber | 74/25 |
| 3,572,136 | 3/1971 | Stanley | 74/25 |
| 3,589,202 | 6/1971 | Stanley | 74/25 |

FOREIGN PATENT DOCUMENTS

| 2153023 | 5/1973 | Fed. Rep. of Germany | 74/25 |
| 353595 | 5/1961 | Switzerland | 74/25 |

OTHER PUBLICATIONS

Design News, Feb. 16, 1968, (Article by Lars G. Soderholm).
Barry Wright Corp. brochure entitled "The Roh'lix System," Bulletin, No. 8.3E.
Amacoil Machinery, Inc. brochure entitled "Variable Pitch Uhing Patent Traverse."

*Primary Examiner*—C. J. Husar
*Assistant Examiner*—Conrad Berman
*Attorney, Agent, or Firm*—S. A. Giarratana; F. L. Masselle; E. T. Grimes

[57] ABSTRACT

An adjustable pitch, zero backlash, rotary-to-linear-motion converter particularly adaptable for the precision positioning of linearly movable light weight mechanisms. The spherical bearing ends of three or more dumbbell-shaped rollers, in an interference fit between a rotatable shaft and the inner surface of a cylindrical sleeve, are partially enclosed in end cages which are clamped together but which may be adjusted so that the parallel roller axes are offset from the shaft axis whereby rotation of the shaft will provide rectilinear movement to the sleeve.

8 Claims, 4 Drawing Figures

ROTARY-TO-LINEAR-MOTION CONVERTER

BRIEF SUMMARY OF THE INVENTION

This invention relates to mechanical rotational shaft-to-linear translators and particularly to an adjustable pitch linear converter for low torque, zero backlash, precision applications.

There are several types of mechanisms for effecting rotational to rectilinear movement by use of rollers that frictionally engage a rotatable shaft in such a way that the roller axes are inclined from the axis of the shaft. Some types of converters employ fixed pitch rollers that frictionally engage the shaft to provide to the roller housing a linear motion that is always proportional to the shaft rotation velocity. Such a system is similar in operation to the conventional lead screw arrangement and is often employed where it is desired to provide intentional slippage in emergency situations, for example, in door or window closures. An example of such a lead screw converter is described and claimed in U.S. Pat. No. 3,272,021.

U.S. Pat. No. 2,940,322 describes a variable pitch translator employing a plurality of individual wheel-type rollers, the axes of which are interconnected through a gearing arrangement so that the several axes may be simultaneously adjusted to provide the desired pitch along a rotatable shaft against which each roller is spring-biased.

While quite adequate for many applications, the prior art rotary translators are complex, provide a relatively coarse adjustment, a degree of backlash which may affect accuracy, and are excessively bulky for certain applications such as, for example, driving and adjusting microscope stages.

The present invention overcomes the objections of the prior art devices described above.

Briefly described, the rotary-to-linear-motion converter of the invention includes three or more dumbbell-shaped rollers in an interference fit between the surface of a rotatable shaft and the inner surface of a cylindrical sleeve or bore of the element to be moved. The ends of all rollers are caged in one of two cages that may be rotated relative to each other to simultaneously incline all roller axes from the shaft axis to thereby adjust the roller pitch. The roller end cages are not in contact with either shaft or bore and can be adjusted to provide a pitch of 0.0001" of linear motion per shaft revolution or less without backlash upon reversal.

DESCRIPTION OF THE DRAWINGS

In the drawings which illustrate a preferred embodiment of the invention.

DETAILED DESCRIPTION

Figure 1:
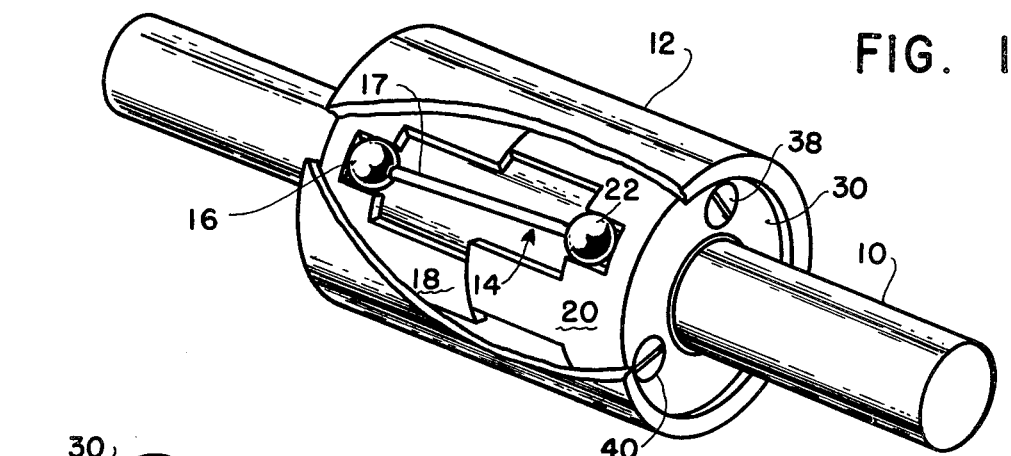
FIG. 1 is a perspective sectional view illustrating the rotary-to-linear converter of the invention.

Turning now to a detailed description of the invention, the embodiment illustrated in FIG. 1 includes a rotatable shaft 10 coaxially mounted within a cylindrical sleeve 12. By way of example, the shaft 10 may be ⅜" in diameter and the sleeve 12 may have a bore diameter of 1". Positioned between the external surface of the shaft 10 and the bore of sleeve 12 are three or more equally spaced dumbbell-shaped rollers, such as the roller 14. Roller 14 and each of the other rollers have enlarged end sections 16 and 22 which are separated by a connecting shaft 17. The enlarged end sections 16, 22 have circular cross-sections and equal diameters at their equators and may be spherical as illustrated or a flattened spherical, or lenticular, shape. The ends are preferably made of a hard metal but may, if desired, be either metal or non-metallic with a resilient portion at least at the equator that engages the shaft 10 and bore of the sleeve 12. The ends 16, 22 are in an interference fit between the shaft 10 and the bore of the sleeve 12 and, in the example given, will be the diameter of 3/16". Connecting shaft 17 may have a diameter of ⅛" and any suitable length such as, for example, 3". Since the equators of the enlarged roller end sections 16, 22 are in an interference fit between the shaft 10 and the bore of sleeve 12, rotation of the shaft will force rotation of the rollers 14. If the longitudinal axis of each of the rollers 14 is parallel with the longitudinal axis of the shaft 10, the rotation of rollers 14 will not impart any transverse force to the sleeve 12. However, a slight canting between the axes will cause rollers 14 to thread their way along the surface of the shaft 10 to thereby impart a longitudinal force upon the sleeve 12.

Figure 2:
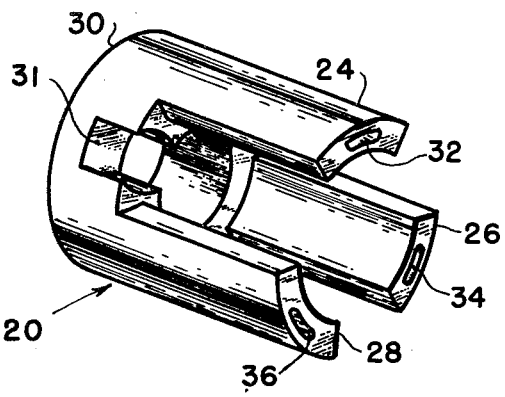
FIG. 2 is a perspective view illustrating in detail one of the two roller cages of the invention.
Figure 4:
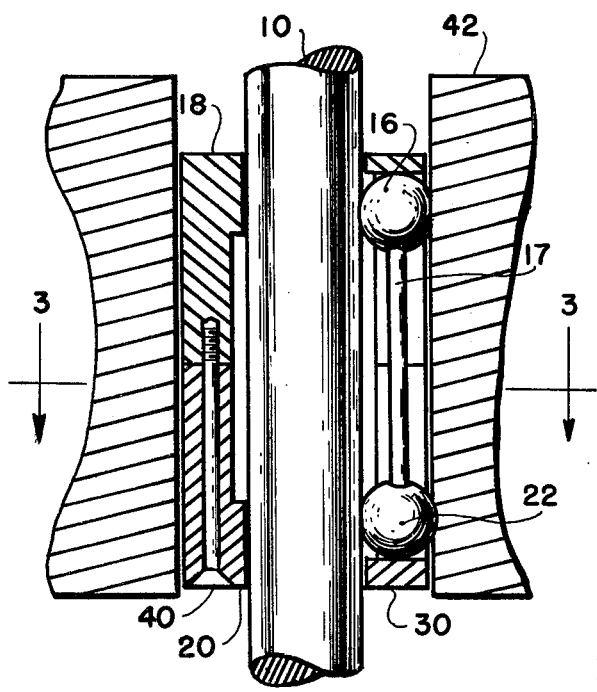
FIG. 4 is a sectional elevation view of the converter taken along the lines 3—3 of FIG. 3.

Each of the enlarged end sections 16 of the rollers 14 is supported in a cage, such as cage 18 supporting the end 16 and the cage 20 supporting the end 22. As best illustrated in FIG. 2, the end cages 18 and 20 are each provided with leg sections 24, 26 and 28, each having an arcuate length of approximately 60° and separated from each other by a similar length spacing. The legs are connected at a base end 30 and the spaces between each leg are counterbored with an arcuate slot, such as the slot 31, into which the enlarged ends of the rollers are loosely fit. Each of the legs of the cage 20 illustrated in FIG. 2 has a longitudinal arcuate slot extending the entire length of the cage and, as illustrated in FIG. 1, terminates at the base end 30 in a hole which is countersunk to accommodate adjustment screws, such as the screws 38 and 40. The adjustment screws loosely fit in the arcuate slots 32, 34 and 36 and into threaded holes in the leg ends of the opposite cage 18, as best illustrated in FIG. 4. As shown in FIG. 1, the axis of the rollers 14 may be adjusted with respect to the axis of shaft 10 by adjusting cage 20 with respect to cage 18 and thereafter tightening the three adjustment screws, such as screws 38 and 40.

Figure 3:
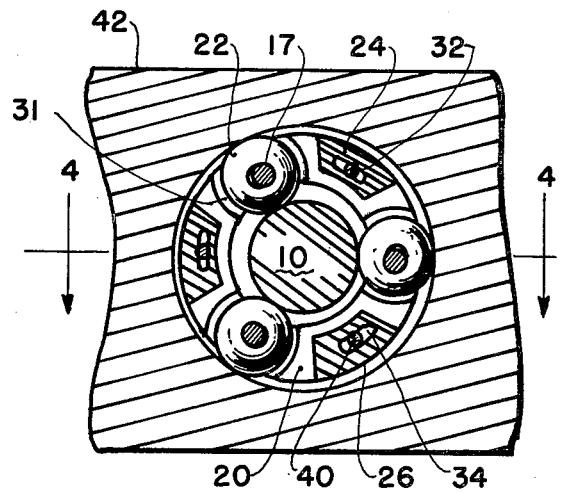
FIG. 3 is a cross-sectional view taken along the lines 4—4 of FIG. 4.

The embodiment illustrated in FIG. 1 contemplates the use of a metallic sleeve 12 of a hardness comparable to that of the shaft 10. Use of a sleeve, such as sleeve 12, is valuable whenever it is desired to impart a longitudinal force to a body comprised of a soft material. If the rotary-to-linear motion converter is employed to drive a hard material, such as a steel stage, the sleeve 12 may be dispensed with and the rollers may directly contact the bore of a hole in the material. FIGS. 3 and 4 are sectional views of the rotary-to-linear-motion converter of the invention in which the rollers 14 are in an interference fit between the shaft 10 and the bore of a longitudinally movable body 42. In these figures, the ends 16, 22 of the rollers are shown with their interconnecting shaft 17 at a slight angle from the longitudinal axis of the center shaft 10 so that rotation of shaft 10 will force the rollers to impart a longitudinal force to the body 42. If the length of the interconnecting shaft 17 is such that the equators of the roller end sections 16 and 22, FIG. 4, are approximately 4" apart, the cages 18 and 20 may be adjusted so that one rotation of a ⅜" diameter shaft 10 will move the body 42 in a longitudinal direction by only 0.0001". An even finer conversion may be obtained by reducing the size of the shaft 10 and lengthening the interconnecting shaft 17 between the roller ends.

Having thus described my invention, what is claimed is:

1. An adjustable pitch rotatable shaft-to-linear converter for imparting motion to a member having a cylinderical bore coaxial with a rotatable shaft and parallel with the direction of said motion, said converter comprising:

at least three drive rollers each having an enlarged end section of circular cross-section and each of said ends separated and connected to its opposite end by a connecting shaft, said rollers being equally spaced about the rotatable shaft and the cylindrical bore to the movable member;

first and second cages for encaging the first and second enlarged ends respectively of said drive rollers, each of said cages being mounted within said cylindrical bore and having a longitudinal aperture for the passage of said rotatable shaft, each of said cages having a plurality of equally spaced legs and having counterbored portions between said legs for the caging of said enlarged end sections, the ends of said legs of said first cage abutting ends of the legs of said second cage, said first and second cages being rotatably adjustable with respect to each other to adjust the pitch angle of said rollers; and means for clamping together said first and second cages.

2. The converter claimed in claim 1 wherein said converter includes three drive rollers and each of said first and second cages include three legs.

3. The converter claimed in claim 2 wherein each leg of said first cage has a longitudinal arcuate slot and the end of each leg said second cage has a threaded hole aligned with the arcuate slot in the adjacent leg of said first cage.

4. The converter claimed in claim 3 wherein said means for clamping said first cage to said second cage includes a threaded screw extending through said arcuate slot and into said threaded hole.

5. The converter claimed in claim 4 wherein said enlarged end sections of said drive rollers are cylindrical.

6. The converter claimed in claim 4 wherein said enlarged sections of said drive rollers are lenticular.

7. The converter claimed in claims 5 or 6 wherein said end sections are metallic.

8. The converter claimed in claims 5 or 6 wherein said end sections have resilient portions at least at their equators respectively, for interference fit between said rotatable shaft and said cylindrical bore.

* * * * *